(12) United States Patent
Stander et al.

(10) Patent No.: US 11,542,109 B2
(45) Date of Patent: Jan. 3, 2023

(54) LOADING VEHICLE AND RECEIVING VEHICLE CONTROL

(71) Applicant: Deere & Company, Moline, IL (US)

(72) Inventors: Francois Stander, Dubuque, IA (US); Michael J. Schmidt, Asbury, IA (US)

(73) Assignee: Deere & Company, Moline, IL (US)

( * ) Notice: Subject to any disclaimer, the term of this patent is extended or adjusted under 35 U.S.C. 154(b) by 464 days.

(21) Appl. No.: 16/826,807

(22) Filed: Mar. 23, 2020

(65) Prior Publication Data

US 2021/0292113 A1 Sep. 23, 2021

(51) Int. Cl.
*B65G 67/04* (2006.01)
*B66F 9/075* (2006.01)
*G05D 1/00* (2006.01)
*G01C 21/34* (2006.01)

(52) U.S. Cl.
CPC ............ *B65G 67/04* (2013.01); *B66F 9/0755* (2013.01); *B66F 9/07581* (2013.01); *G01C 21/34* (2013.01); *G05D 1/0016* (2013.01); *B65G 2814/0302* (2013.01); *B65G 2814/0344* (2013.01); *G05D 2201/0202* (2013.01)

(58) Field of Classification Search
CPC ............ B65G 67/04; B65G 2814/0302; B65G 2814/0344; B66F 9/0755; B66F 9/07581; G01C 21/34; G05D 1/0016; G05D 1/0011; G05D 1/0291; G05D 2201/0202; E02F 3/434; E02F 9/205; E02F 9/262; E02F 9/265

See application file for complete search history.

(56) References Cited

U.S. PATENT DOCUMENTS

| | | | | |
|---|---|---|---|---|
| 7,578,079 B2* | 8/2009 | Furem | ...................... | E02F 9/205 172/3 |
| 7,627,410 B2* | 12/2009 | Berry | ..................... | E02F 9/2029 701/1 |
| 8,862,390 B2* | 10/2014 | Sugawara | .............. | G08G 1/137 701/431 |
| 2015/0134147 A1* | 5/2015 | Woo | ......................... | B61L 3/127 701/2 |

(Continued)

FOREIGN PATENT DOCUMENTS

| DE | 102019203300 A1 | 10/2019 |
|---|---|---|
| DE | 102019212322 A1 | 2/2020 |
| DE | 102020104283 A1 | 8/2020 |

OTHER PUBLICATIONS

Stentz et al, A Robotic Excavator for Autonomous Truck Loading, Autonomous Robots, pp. 175-186. (Year: 1999).*

(Continued)

*Primary Examiner* — Russell Frejd
(74) *Attorney, Agent, or Firm* — Joseph R. Kelly; Kelly, Holt & Christenson, PLLC

(57) ABSTRACT

A loading vehicle detects the position of a receiving vehicle relative to the loading vehicle and determines whether the receiving vehicle is to be repositioned. If so, it sends a repositioning message to the receiving vehicle and receives acknowledgement that the loading vehicle has remote control of the positioning mechanisms in the receiving vehicle. A loading vehicle operator input is detected and a position control signal is sent to the receiving vehicle to reposition it relative to the loading vehicle.

16 Claims, 14 Drawing Sheets

(56) References Cited

U.S. PATENT DOCUMENTS

2015/0362358 A1* 12/2015 Jensen ............. G06Q 10/06393
                                                          414/21
2018/0173221 A1*  6/2018 Samaraweera ...... G05D 1/0027
2020/0050205 A1*  2/2020 McClelland ......... G05D 1/0287

OTHER PUBLICATIONS

German Search Report issued in application No. DE102021201554.9 dated Sep. 13, 2021 (04 pages).

* cited by examiner

LOADING VEHICLE AND RECEIVING VEHICLE CONTROL

FIELD OF THE DESCRIPTION

The present description relates generally to loading machines (such as loaders, excavators knuckle boom loaders, etc.) and receiving machines (such as dump trucks, logging trucks, etc.). More specifically, the present invention relates to controlling the machines based on inter-vehicle communication.

BACKGROUND

There are a wide variety of different types of vehicles that are used to load material into vehicles. For instance, these loading vehicles can include excavators, wheel loaders, knuckle boom loaders, among others. Similarly, there are a wide variety of different types of vehicles that receive the material and transport it. Such vehicles can include dump trucks, articulated dump trucks, logging trucks, among others.

In construction scenarios, loading vehicles (such as an excavator or a wheel loader) often performs a digging operation to obtain material from a pile, from the ground, or elsewhere. It then moves the material so that it is over a dump body of a receiving vehicle, such as a dump truck, and loads the material into the receiving vehicle. Knuckle boom loaders, or other forestry equipment, can also be used to load logs onto logging trucks.

The receiving vehicles then often transport the material that was loaded onto them to an unloading site where they are dumped or otherwise delivered. It is not uncommon for there to be a plurality of different receiving vehicles that transport material over the same route, to the dumping or unloading area.

The discussion above is merely provided for general background information and is not intended to be used as an aid in determining the scope of the claimed subject matter.

SUMMARY

A loading vehicle detects the position of a receiving vehicle relative to the loading vehicle and determines whether the receiving vehicle is to be repositioned. If so, it sends a repositioning message to the receiving vehicle and receives acknowledgement that the loading vehicle has remote control of positioning mechanisms in the receiving vehicle. A loading vehicle operator input is detected and a position control signal is sent to the receiving vehicle to reposition it relative to the loading vehicle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
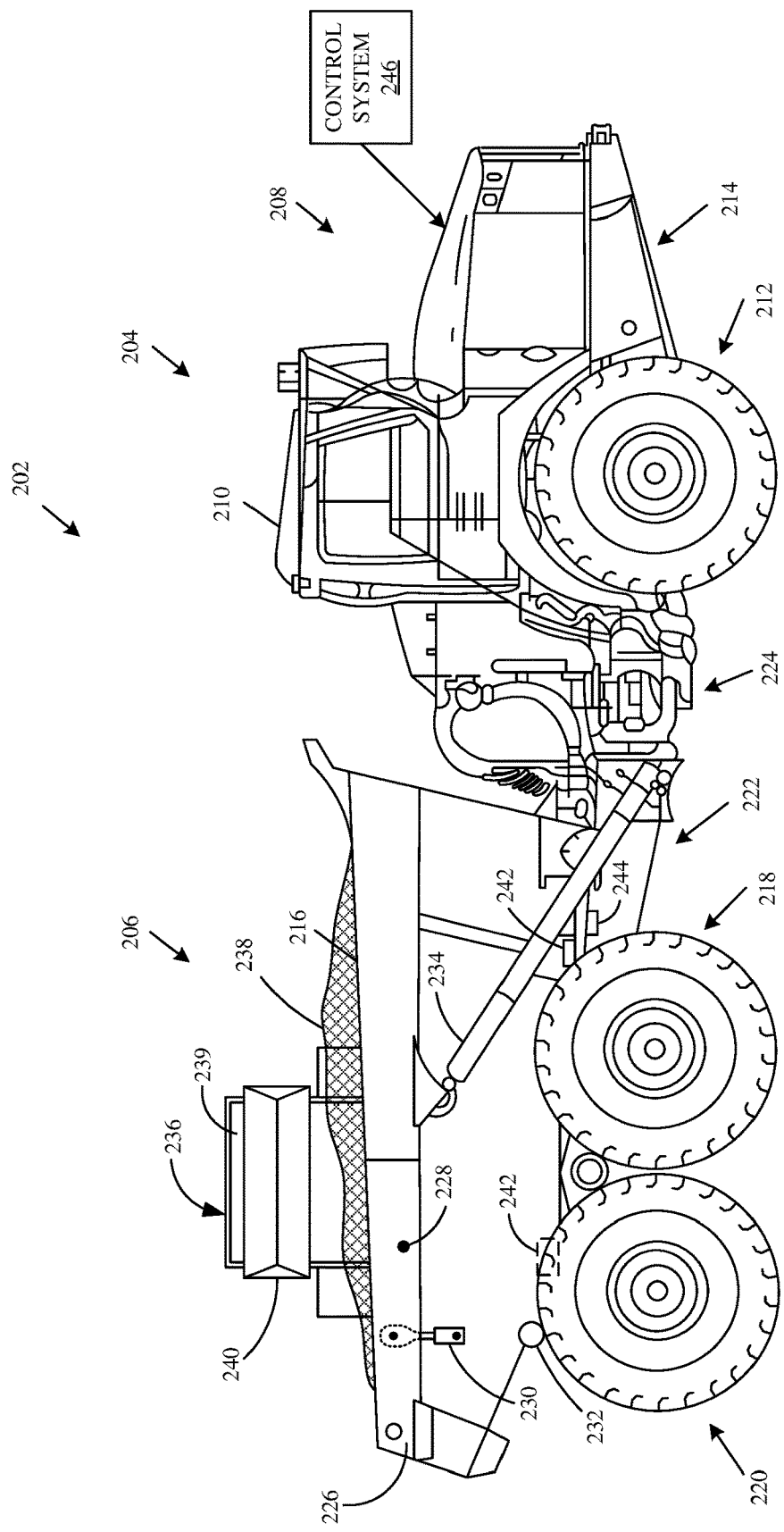
FIG. 1 is a pictorial illustration of one example of a dump truck (receiving vehicle).

As discussed above, loading vehicles are often tasked with loading material into receiving vehicles. The receiving vehicles then transport the material along a transport route to an unloading position where it is unloaded. In such scenarios, it can be difficult to tell whether the loading operation is successful. For instance, an operator of the loading vehicle may operate the loading vehicle to load too much material onto the receiving vehicle so that some of it spills out of a dump body on the receiving vehicle. This is highly inefficient because, after the receiving vehicle leaves, the loading vehicle must then perform a cleanup operation to clean up the spilled material.

Similarly, it can be very difficult to position the receiving vehicle relative to the loading vehicle in an efficient way. This is because the operator of the receiving vehicle may have limited visibility with respect to the loading vehicle. However, it is not uncommon for the operator of the loading vehicle to have better visibility with respect to the position of the two vehicles, relative to one another.

In addition, it is not uncommon for a plurality of receiving vehicles to transport the material over a common transport route. That is, multiple receiving vehicles may be loaded by the loading vehicle, and transport the material over the same transport route to the unloading position. In construction and logging scenarios, this can mean that the receiving vehicles travel over relatively uneven and tortuous terrain. Thus, the operators of the receiving vehicles may need to change settings (such as transmission settings, speed control, etc.) in order to navigate over the transport route efficiently.

The present description thus proceeds with respect to a system in which a loading vehicle digs material to be transported and weighs it or otherwise measures the amount of material it has. It then loads that material onto the receiving vehicle which also weighs it or otherwise determines the amount of material it has received. In this way, the efficiency of the loading operation can be identified and controlled. For instance, if the measurements indicate that the loading vehicle has loaded more material than was received by the receiving vehicle, this may be an indication that spillage has occurred. It may also be an indication that the operator of the loading vehicle is not performing the loading operation in an accurate way, and is thus dumping material onto the ground.

Similarly, the present description proceeds with respect to a control system which allows the operator of the loading vehicle to assume remote control of the receiving vehicle to reposition it relative to the loading vehicle. By way of example, if a wheel loader is about to load material into a dump truck, but the dump truck has stopped short of a desired location where it will receive the load, the present description proceeds with respect to a control system that allows the operator of the wheel loader to take remote control of the dump truck and reposition it into the desired receiving position.

Further, the present description proceeds with respect to a system that allows vehicle-to-vehicle communication to communicate settings change notifications so that the vehicles can operate more efficiently. By way of example, assume that a dump truck approaches an incline and begins to ascend the incline on the transport route. Assume that part way up the incline, the operator must shift into a lower gear, but that it would be more efficient if the operator had shifted into the lower gear prior to beginning the ascent of the incline. In that case, the present system can automatically identify a location of the incline and indicate that the vehicle was shifted into a lower gear (and it may specify the gear) at that location. This information can be sent to other vehicles following on the same transport route, and the same settings change (the shift into the lower gear) can automatically be implemented on the following vehicles. These and other items are described in more detail below.

FIG. 1 illustrates one example of a mobile work machine 202, in the form of an off-road construction vehicle (illustratively a rear dump vehicle or truck). Machine 202 includes a power head section 204 and a load carrying section 206. The power head section 204 includes a vehicle engine or motor 208, an operator compartment 210 and a front axle and wheels 212 which are all coupled to a front frame 214. The load carrying section 206 includes a dump body 216, a first rear axle and wheels 218 and a second rear axle and wheels 220 which are all coupled to a rear frame 222. The front frame 214 of the power head section 204 is coupled to the rear frame 222 of the load carrying section 206 by articulation and oscillation joints 224. The articulation joint enables the power head section 204 and the load carrying section 206 to pivot relative to one another about a vertical axis for steering machine 202, and the oscillation joint allows the power head section 204 and the load carrying section 206 to rotate relative to one another about a longitudinal axis extending along the length of machine 202.

FIG. 1 shows that dump body 216 has a movable tailgate 226. Tailgate 226 pivots about a pivot axis defined at 228. Movement of tailgate 226 can be driven by actuator 230. Actuator 230 can be arranged in a wide variety of different ways, and it is shown as a hydraulic cylinder for the sake of example only. Thus, actuator 230 can be controlled to raise tailgate 226 and to lower it.

FIG. 1 also shows that dump body 216 pivots about a pivot axis defined at 232. It can be pivoted between the transport position shown in FIG. 1, and a dumping position. Dump body 216 is driven, for pivotal movement about axis 232, by actuator 234. Actuator 234 can be actuated to raise dump body 216 from its transport position, to its dumping position.

Also, in one example, there may be pairs of actuators 230 and 234. For instance, actuators 230 and 234 may have corresponding counterpart actuators similarly disposed on the opposite side of dump body 216.

FIG. 1 also shows that a loader 236 is loading material 238 into dump body 216. Loader 236 may be a wheel loader, or any of a variety of other loading machines. It can be seen in FIG. 1 that loader 236 has an operator compartment 239, where an operator operates interface mechanisms in order to control a bucket 240 to dump the material 238 into dump body 216.

FIG. 1 shows that machine 202 can have one or more weight or mass sensors 242. For example, weight or mass sensors 242 can be scales or other measurement devices disposed between the dump body 216 and the frame the supports it. Therefore, as material 238 is loaded into dump body 216, its weight or mass can be sensed by detectors 242.

Also, in FIG. 1, the rear frame 222 can have one or more accelerometers 244 disposed thereon. Accelerometers 244 can illustratively detect accelerations imparted by the material that is loaded or by other sources. Further, FIG. 1 shows that machine 202 has a control system 246 which is described in more detail below with respect to FIG. 4.

Figure 2:
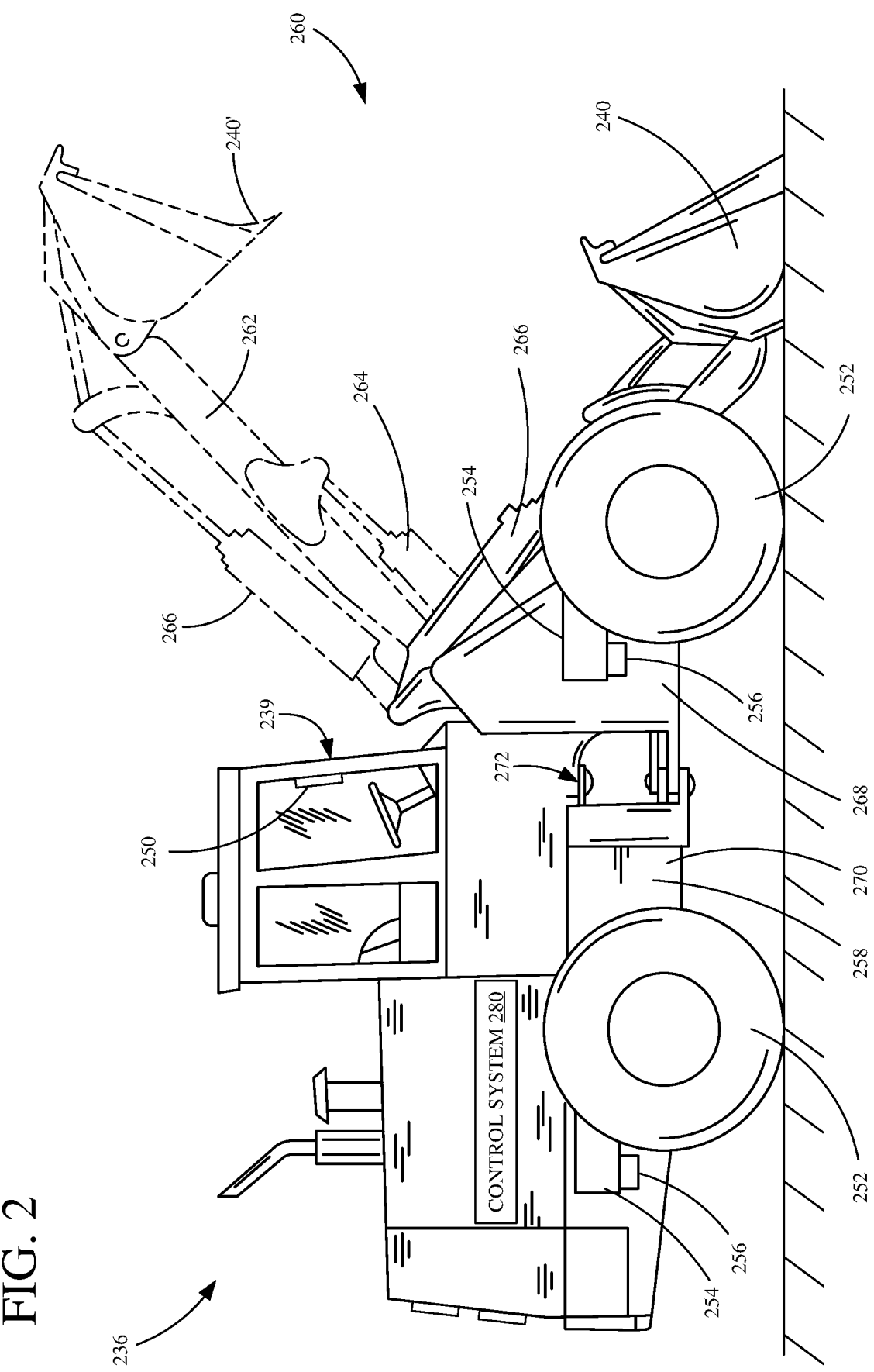
FIG. 2 is a pictorial illustration of one example of a loading vehicle (a wheel loader).

FIG. 2 illustrates another example of a mobile work machine, in the form of an off-road construction vehicle (illustratively a front or wheel loader 236 such as that partially shown in FIG. 1). Some items are similar to those shown in FIG. 1 and they are similarly numbered. Machine 236 includes a cab or operator compartment 239 having a display device 250, ground-engaging element(s) 252 (e.g., wheels), motor(s) 254, speed sensor(s) 256, a frame 258, and a boom assembly 260. Boom assembly 260 includes a boom 262, a boom cylinder 264, a bucket 240 and a bucket cylinder 266. Boom 262 is pivotally coupled to frame 258 and may be raised and lowered by extending or retracting boom cylinder 264. FIG. 2 illustrates bucket 240 in an unloading or dump position 240'.

Bucket 240 is pivotally coupled to boom 262 and may be moved through an extension or retraction of bucket cylinder 266. During operation, mobile machine 236 can be controlled by an operator within cab 239 in which mobile machine 236 can traverse a worksite. In one example, each one of motor(s) 254 are illustratively coupled to, and configured to drive, wheel(s) 252 of mobile machine 236. Speed sensor(s) 256 are illustratively coupled to each one of motor(s) 254 to detect a motor operating speed.

In the illustrated example, machine 236 comprises an articulating body where a front portion 326 is pivotably connected to a rear portion 270 at a pivot joint 272. An articulation sensor can be utilized to determine the articulation angle, at pivot joint 272, which can be used to determine the path of machine 236. In another example in which the body of machine 236 is non-articulating, the angle of the front and/or rear wheels 252 is rotatable relative to the frame.

Machine 236 includes a control system 280. Control system 280 is described in greater detail below.

Figure 3:
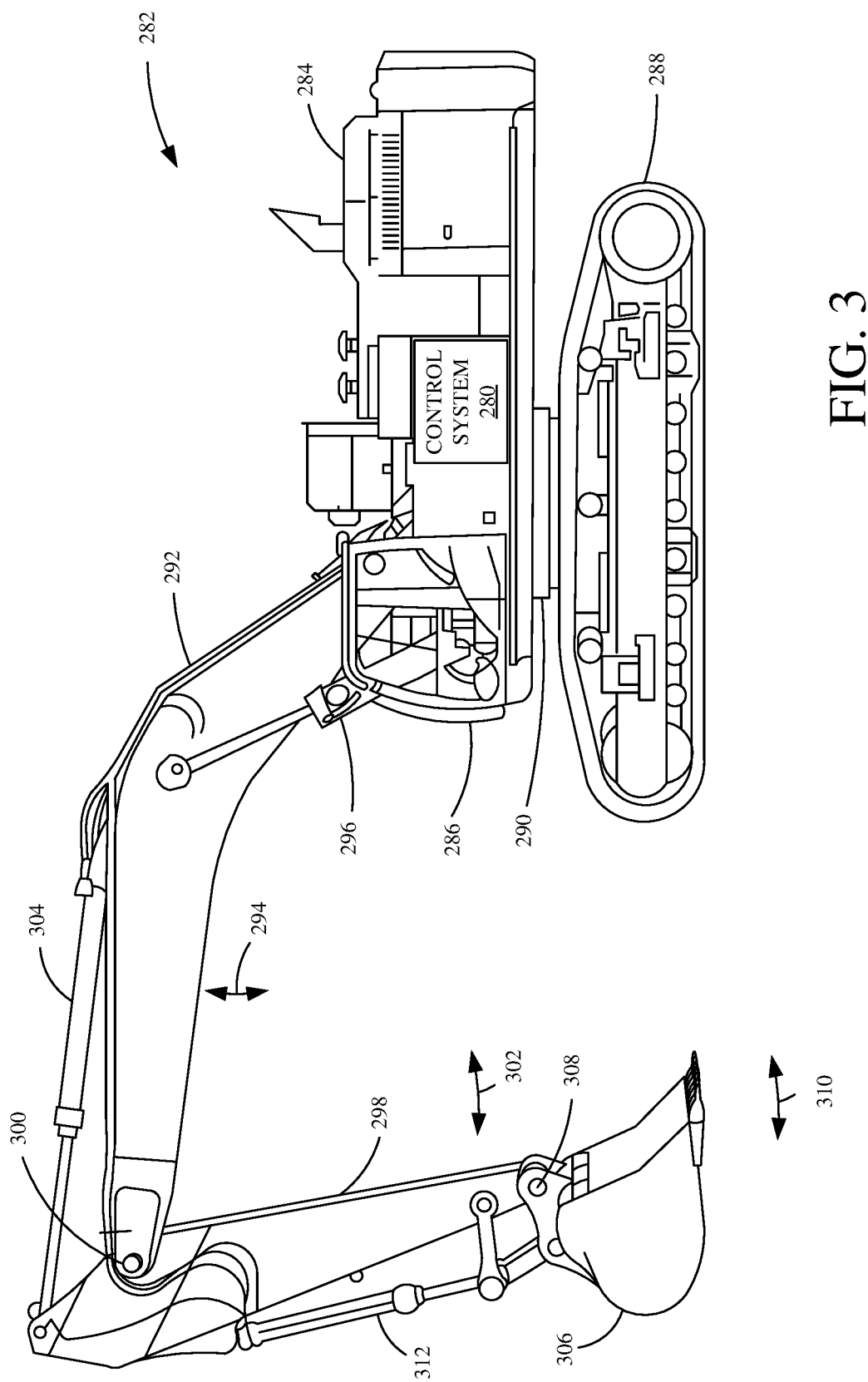
FIG. 3 is a pictorial illustration of another example of a loading vehicle (an excavator).

FIG. 3 illustrates another example of a mobile work machine 282, in the form of an off-road construction vehicle (illustratively a hydraulic excavator 282). Machine 282 includes a house 284 having an operator cab or operator compartment 286 rotatably disposed above tracked portion 288. House 284 may rotate three-hundred sixty degrees about tracked portion 288 via rotatable coupling 290. A boom 292 extends from house 284 and can be raised or lowered in the direction indicated by arrow 294 based upon actuation of hydraulic cylinder 296. A stick 298 is pivotably connected to boom 292 via joint 300 and is movable in the direction of arrows 302 based upon actuation of hydraulic cylinder 304. Bucket 306 is pivotably coupled to stick 298 at joint 308 and is rotatable in the direction of arrows 310 about joint 308 based on actuation of hydraulic cylinder 312.

When an operator within cab 286 needs to move boom 292, he or she engages suitable controls. Machine 282 also includes a control system 280 which is described in more detail below.

Figure 4A:
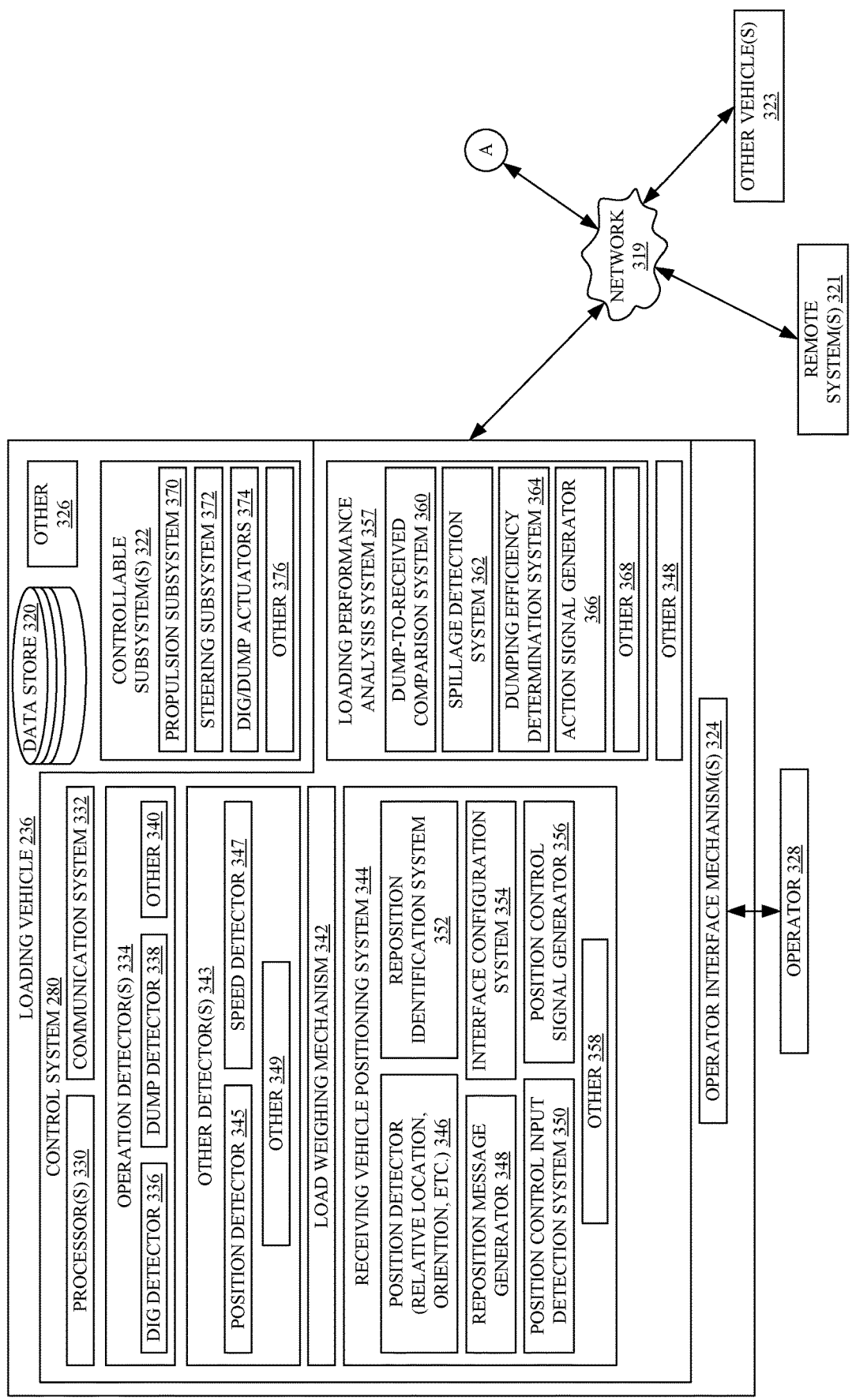
FIGS. 4A and 4B (collectively referred to herein as FIG. 4) are block diagrams showing one example of a material loading architecture with a loading vehicle and a receiving vehicle, in more detail.
Figure 4B:
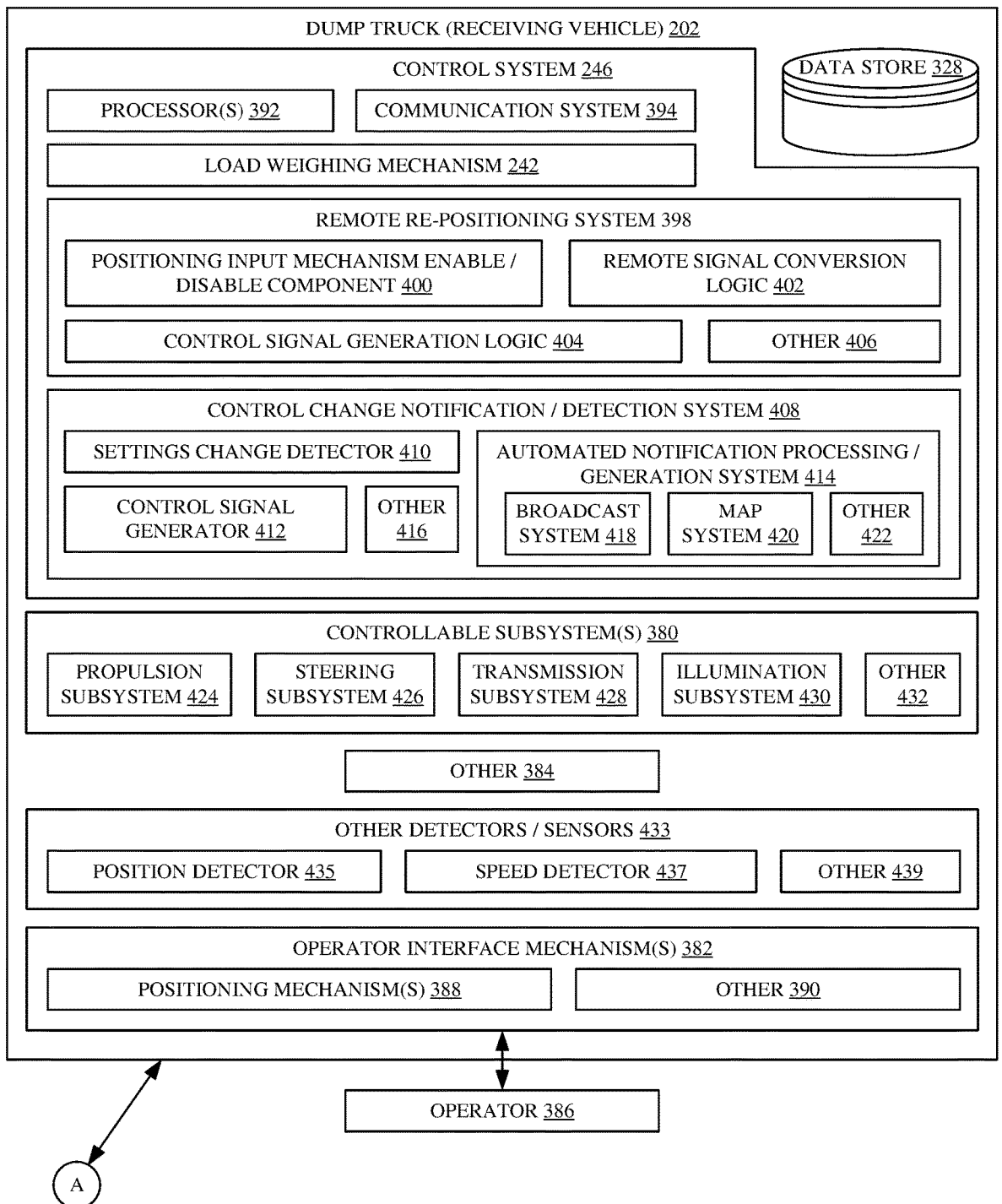

FIGS. 4A and 4B (collectively referred to herein as FIG. 4) illustrate a block diagram showing one example of a loading architecture with an example of portions of wheel loader (loading vehicle) 236 (from FIG. 2) and dump truck (or receiving vehicle) 202 from FIG. 1. Loading vehicle 236 includes control system 280, data store 320, controllable subsystems 322, operator interface mechanisms 324, and it can include other items 326. Operator interface mechanisms 324 can be disposed inside the operator compartment 239 of machine 236 and can include such things as a steering wheel, joysticks, pedals, levers, linkages, point and click devices, a touch sensitive display screen, a speech recognition and speech synthesis system, as well. Operator interface mechanisms 324 can include other audio, visual, haptic or other mechanisms as well. Operator 328 interacts with operator interface mechanisms 324 in order to control and manipulate loading vehicle 236 and sometimes other vehicles.

FIG. 4 also shows that machines 236 and 202 can communicate with one another over network 319. They can also communicate with one or more remote systems 321 and other vehicles 323. Network 319 can be a wide area network, a local area network, a near field communication network, a cellular communication network, or any of a wide variety of other networks or combinations of networks. Remote systems 321 can be vendor systems, maintenance systems, manager systems, remote operator systems or other systems. Other vehicles 323 can include other receiving vehicles, other loading vehicles, or any of a wide variety of different types of vehicles.

Control system 280 in loading vehicle 236 includes one or more processors 330, communications system 332, operation detectors 334 (which can include dig detector 336, dump detector 338, and other items 340), other detectors/sensors 343 (which can include position detector 345, speed detector 347 and other sensors or detectors 349) load weighing mechanism 342, receiving vehicle positioning system 344, load performance analysis system 357, and it can include other items 348.

Communication system 332 is illustratively used to facilitate communication among items on loading vehicle 236 and to communicate with dump truck 202 as well as remote systems 321 and other vehicles 323. Therefore, communication system 332 may vary depending upon the type of communication it is to facilitate.

Operation detector 334 detects what operations are being performed by loading vehicle 236. Dig detector 336, for example, detects when loading vehicle 236 is performing a digging operation (such as when it is digging material out of a pile using bucket 240). Dig detector 336 can do this by detecting the cylinder pressures in the cylinders that are being used to control the position of bucket 240. It can do this by sensing the weight of material in bucket 240, or in other ways. Dump detector 338 illustratively detects when vehicle 236 has performed or is performing, a dumping operation to load material into dump truck 202. Dump detector 338 can also detect this based upon the cylinder pressures, the weight of material in bucket 240, or in other ways.

Load weighing mechanism 342 can be one or more scales or other measurement devices (such as devices that measure the pressure in the hydraulic cylinders) that generate a signal indicative of the weight or mass of the load in bucket 240. It also generates an output signal indicative of this.

Receiving vehicle positioning system 344 can be used to remotely control receiving vehicle 202 to reposition it relative to loading vehicle 236. In doing so, receiving vehicle positioning system 344 can receive operator inputs from operator 328, through operator interface mechanisms 324, and generate position control signals that are provided to dump truck 202, to reposition it. Therefore, in one example, receiving vehicle positioning system 344 includes position detector 346 which can detect the relative position, location, and/or orientation, etc. of vehicles 236 and 202 relative to one another. It can also illustratively detect the absolute position of the different vehicles in a local or global coordinate system (such as using a GPS receiver or other positioning system). System 344 also illustratively includes reposition message generator 348, position control input detection system 350, reposition identification system 352, interface configuration system 354, position control signal generator 356, and it can include other items 358.

Reposition identification system 352 determines whether dump truck 202 needs to be repositioned to a more desirable position for loading. If so, reposition message generator 348 sends a message to dump truck 202 indicating that operator 328 is to begin remote controlling dump truck 202, to reposition it. Interface configuration system 354 reconfigures the operator interface mechanism 324 so that operator 328 can interact with them in order to reposition dump truck 202. Position control input detection system 350 detects inputs from operator 328 to reposition dump truck 202. Based on the inputs, position control signal generator 356 generates position control signals that are sent by communication system 332 to dump truck 202 to reposition dump truck 202.

Loading performance analysis system 357 illustratively includes dumped-to-received comparison system 360, spillage detection system 362, dumping efficiency determination system 364, action signal generator 366, and it can include other items 368. Comparison system receives an input from load weighing mechanism 342 indicating the weight or mass of the material that is being carried by bucket 240 and that is about to be loaded into the dump body 216 of dump truck 202. It also receives a load signal from dump truck 202 indicating the amount of material that is dumped. It compares the two to determine whether the entirety of the loaded material in bucket 240 was actually dumped into dump body 216 of dump truck 202, or whether some of it spilled.

Spillage detection system 362 receives the output of comparison system 360 and identifies when spillage occurs. Dumping efficiency determination system 364 can identify the magnitude of the spillage based upon the outputs from comparison system 360 and spillage detection system 362. It can thus determine the efficiency of each bucket dumping operation, or of an entire loading operation in which loading vehicle 236 completely loads the dump body 216 of dump truck 202.

Action signal generator 366 can generate an action signal based upon the outputs of systems 360, 362 and 364. The action signal may trigger positioning system 344 to again reposition dump truck 202 into a better receiving position. It can generate a control signal to control operator interface mechanisms 324 to notify operator 328 that spillage is occurring, to notify operator 328 of the efficiency with which the loading operation is being performed, or to indicate other things to operator 328. Action signal generator 366 can also control communication system 332 to send the information from systems 360, 362 and 364 to remote systems 321 or other vehicles 323.

Controllable subsystems 322 can include a wide variety of subsystems that are controlled by control system 280, by operator inputs through operator interface mechanism 324, or in other ways. FIG. 4 shows that the controllable subsystems 322 include a propulsion subsystem 370, steering subsystem 372, dig/dump actuators 374, and they can include a wide variety of other subsystems 376.

Dump truck 202 includes controllable subsystems 380, operator interface mechanisms 382, other detectors and sensors 433 (which can include position detector 435, speed detector 437 and other detectors 439), and it can include a wide variety of other items 384. Operator 386 interacts with operator interface mechanisms 382 in order to control and manipulate dump truck 202. Operator interface mechanisms 382 can include similar or different operator interface mechanisms to those described above with respect to mechanisms 324. In one example, operator interface mechanisms 382 include positioning mechanisms 388 that operator 386 can interact with in order to position dump truck 202. Thus, they can include a joystick or steering wheel that can be used to steer dump truck 202, a pedal or other mechanism that can be used to control the speed of dump truck 202. Operator interface mechanisms 382 can include a wide variety of other items 390 as well.

Control system 246 includes one or more processors 392, communication system 394, load weighing mechanism 396, and remote repositioning system 398. Communication system 394 illustratively facilitates communication among the items on dump truck 202, and with other loading vehicle 236, remote system 321 and other vehicles 323 over network 319. Load weighing mechanisms 242 generate a signal indicative of the weight or mass of the material 238 in dump body 216.

Remote re-positioning system 398 can include positioning input mechanism input mechanism enable/disable component 400, remote signal conversion logic 402, control signal generation logic 404, and it can include other items 406. Control system 246 also illustratively includes control change notification detection system 408.

Positioning input mechanism enable/disable component 400 receives the communication from reposition message generator 348 indicating that loading vehicle 236 is going to take remote control of the position of dump truck 202. Based on that message, it disables the positioning mechanisms 388 in the operator interface mechanisms 382 so that operator 386 does not attempt to simultaneously control the position of dump truck 202. When repositioning is complete, positioning input mechanism enable/disable component 400 again enables the positioning mechanisms 388 in the operator interface mechanisms 382. Remote signal conversion logic 402 receives the position control signals generated by position control signal generator 356 on loading vehicle 236 and converts them into position control signals that can control the propulsion subsystem 424 and steering subsystem 426 to control the position of dump truck 202. Once those signals are converted, control signal generation logic 404 generates the control signals for controlling the controllable subsystems 380, appropriately, so that dump truck 202 can be repositioned under the control of operator 328 of loading vehicle 236.

System 408 can include settings change detector 410, control signal generator 412, automated notification system 414, and it can include other items 416. Automated notification processing/generation system 414 can include broadcast system 418, map system 420, and it can include other items 422. Setting change detector 410 detects when operator 386 makes a settings change on dump truck 202. The detected settings change can be one of a pre-defined type of setting changes (such as shifting the transmission, rapid accelerations or decelerations, actuating illumination devices such as headlights, engaging differential lock, etc.). When this occurs, automated notification processing/generation system 414 generates a notification that can be sent to, and received by, other vehicles in the vicinity, so that when they reach the location where dump truck 202 detected the settings change, the other vehicles can automatically make that settings change as well.

Broadcast system 418 generates a notification of the settings change (such as indicating that dump truck 202 engaged differential lock at a particular geographic location). It then transmits that notification so that it can be received by other vehicles (such as other dump trucks) 323. In one example, broadcast system 418 knows the particular other vehicles 323 that it is communicating with, and it initiates communication with those specific vehicles. In another example, broadcast system 418 simply broadcasts a message so that other vehicles 323 that are in the vicinity can receive the message and take appropriate action.

In another example, map system 420 makes an entry on a map/navigation system that is accessible by other vehicles 323. The entry illustratively indicates the geographic location where dump truck 202 is when the settings change is detected, and it also indicates the particular setting change. When other vehicles approach that location, they access the entry made by dump truck 202 and can make the same setting change.

Automated notification processing/generation system 414 also receives notifications from other vehicles 323 of settings changes. It identifies, from those notifications, where the settings change occurred and what setting change actually took place. It can then use control signal generator 412 to automatically make the same settings change when dump truck 202 is at the same geographic location. For instance, if system 414 receives a notification from another dump truck that the differential lock was engaged at a particular geographic location, then system will control control signal generator 412 to engage the differential lock on dump truck 202 as dump truck 202 approaches that geographic location.

Controllable subsystems 380 can include a propulsion subsystem 424, a steering subsystem 426, a transmission subsystem 428, an illumination subsystem 430, and any of a wide variety of other subsystems 432. Propulsion subsystem 424 can be controlled to control the direction (forward/reverse) and speed of dump truck 202. Steering subsystem 426 can be controlled to control the route of dump truck 202. Transmission subsystem 428 can be controlled to control the transmission on dump truck 202. Illumination system 430 can be used to control the lighting elements on dump truck 202.

Figure 5A:
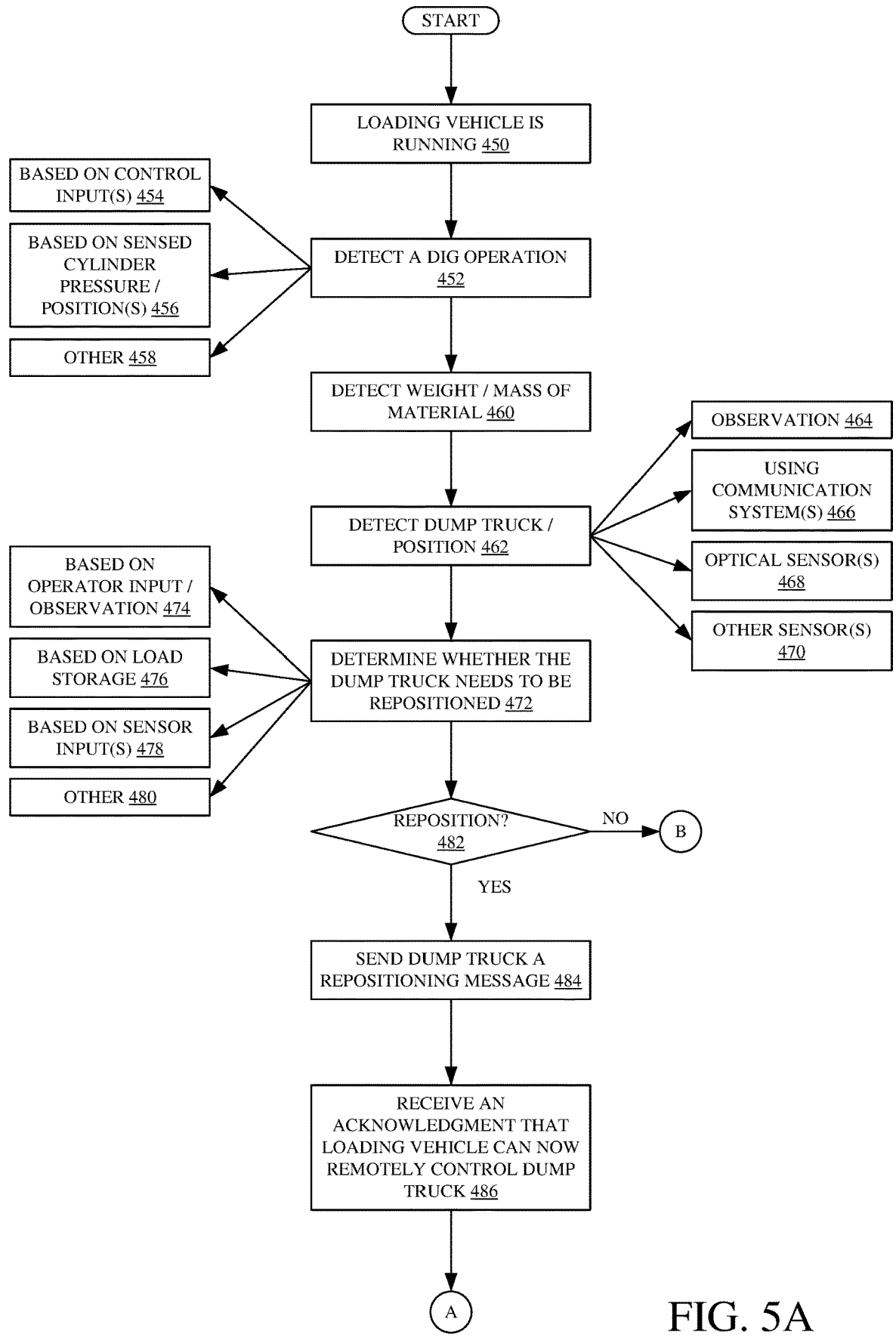
FIGS. 5A and 5B (collectively referred to herein as FIG. 5) illustrate a flow diagram showing one example of the operation of a loading vehicle in loading material onto a receiving vehicle (such as a dump truck), automatically and remotely repositioning the receiving vehicle relative to the loading vehicle, and identifying a dumping operation performance.
Figure 5B:
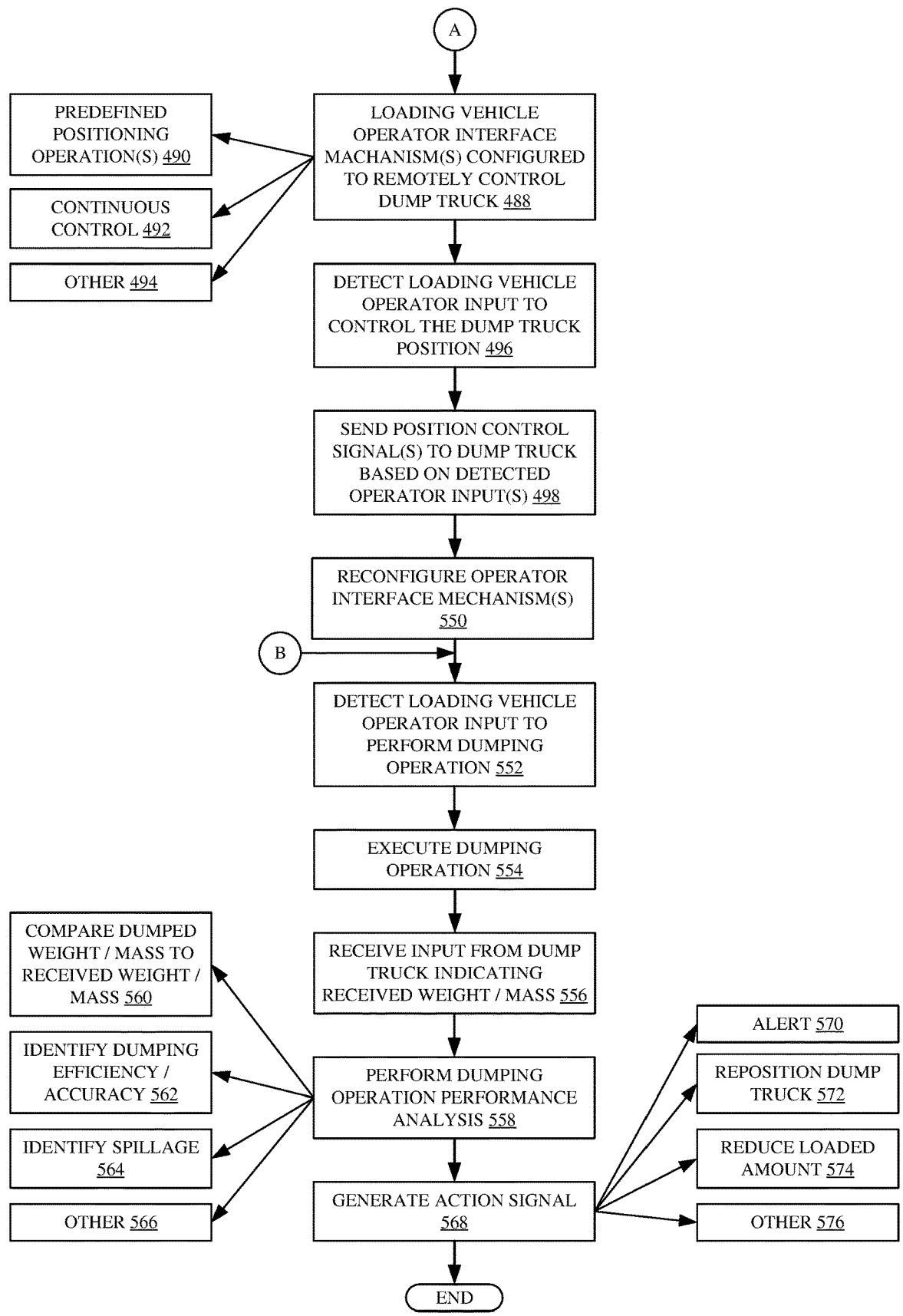

FIGS. 5A and 5B (collectively referred to herein as FIG. 5) show a flow diagram indicating one example of the operation of loading vehicle 236 in remotely repositioning dump truck 202 and in identifying dumping performance. It is first assumed that loading vehicle 236 is running. This is indicated by block 450 in the flow diagram of FIG. 5. Operation detector 334 than uses dig detector 336 to detect that a dig operation is being performed. This is indicated by block 452. For example, loading vehicle 236 may be digging material from a pile. This can be detected based on control inputs from the operator that are consistent with a dig operation. This is indicated by block 454. It can also be based on sensed cylinder pressures or cylinder positions. This is indicated by block 456. It can be based on a wide variety of other things as well, and this is indicated by block 458.

Load weighing mechanism 342 then detects the weight or mass of the material that was obtained during the dig operation. This is indicated by block 460.

Position detector 346 then detects that the dump truck 202 is in close proximity to loading vehicle 236, and also detects the position of the dump truck 202. This is indicated by block 462. The position can be the position as indicated by global coordinates (such as using a GPS receiver or the like) and sent from dump truck 202 to loading vehicle 236, or it can be from a sensor that senses the relative position of the dump body of dump truck 202 relative to loading vehicle 236. The position of dump truck 202 can be based on the observations of operator 328 as well. This is indicated by block 464. Once loading vehicle 236 detects that dump truck 202 is in close proximity, then communication systems 332 and 394 can communicate the positions of the loading vehicle 236 and dump truck 202, respectively, to one another. Using communication systems to communicate position is indicated by block 466. The relative position of the two vehicles can be sensed by optical sensors 468, or with a wide variety of other sensors 470.

Based upon the information received, reposition identification system 352 determiners whether dump truck 202 is to be repositioned. Determining whether the dump truck needs to be repositioned is indicated by block 472. This determination can be based on an operator input from operator 328 indicating that operator 328 wishes to reposition dump truck 202. This is indicated by block 474.

Determining whether the dump truck needs to be repositioned can be done automatically as well. For instance, if loading performance analysis system 357 determines that there has been spillage of material onto the ground (as described in greater detail below), then a reposition alert can be generated indicating that the dump truck 202 should be repositioned. This is indicated by block 476.

In addition, simply by knowing the relative position of dump truck 202 relative to load vehicle 236, reposition identification system 352 may determine that repositioning is needed. Thus, the determination as to whether repositioning is needed may be based on the output from position detector 346 that indicates those relative positions. This is indicated by block 478. A determination as to whether the dump truck 202 is to be repositioned can be made in a wide variety of other ways as well, and this is indicated by block 480.

If it is determined that the dump truck is to be repositioned, as indicated by block 482, then reposition message generator 348 sends a repositioning message to remote repositioning system 398 in dump truck 202. This is indicated by block 484 in the flow diagram of FIG. 5. The message indicates to positioning input mechanism enable/disable component 400 that it should disable the operator positioning mechanisms 388 so that operator 328 can remotely reposition dump truck 202, without operator 386 interfering. Once dump truck 202 is configured for remote repositioning, then remote repositioning system 398 acknowledges that to receiving vehicle positioning system 344. Receiving an acknowledgement that the loading vehicle 236 can now take remote control of dump truck 202 is indicated by block 486 in the flow diagram of FIG. 5.

Interface configuration system 254 then configures the operator interface mechanisms 324 so that operator 328 can interact with them in order to remotely control the position of dump truck 202. Configuring the operator interface mechanisms 324 for remote control is indicated by block 488 in the flow diagram of FIG. 5. In one example, operator interface mechanisms 324 can be configured with predefined positioning mechanisms. For instance, it may be that operator 328 can actuate a button to move the dump truck 202 ahead by three feet (or to perform another pre-defined operation). This is indicated by block 490. The operator interface mechanisms 324 may be configured for continuous control by operator 328. For instance, the joysticks, steering wheels, accelerator mechanism, etc. on operator interface mechanisms 324 may be configured so that operator 328 can continuously control dump truck 202, as if operator 328 were in the operator compartment of dump truck 202. This is indicated by block 492 in the flow diagram of FIG. 5. The loading vehicle operator interface mechanisms 324 can be configured in other ways as well. This is indicated by block 494.

Operator 328 then begins interacting with the operator interface mechanisms 324 to reposition dump truck 202. Position control input detection system 350 detects those interactions and provides them to position control signal generator 356. Position control signal generator 356 generates position control signals that are communicated to remote re-positioning system 398 in dump truck 202. Detecting the operator inputs through operator interface mechanisms 324 is indicated by block 496 in the flow diagram of FIG. 5, and generating and sending position control signals to the dump truck 202, based upon the detected operator inputs, is indicated by block 498.

As is described in greater detail below with respect to FIG. 6, remote repositioning system 398 receives those signals and generates control signals to control the controllable subsystems 380 in order to reposition dump truck 202 in accordance with the position control signals it receives from loading vehicle 236.

At some point, when the dump truck 202 is in the proper position, interface configuration system 354 reconfigures the operator interface mechanisms 324, if needed, so that operator 328 can again interact with them to control loading vehicle 236 in the normal way. This is indicated by block 550 in the flow diagram of FIG. 5.

Operator 328 then provides inputs to perform a dumping operation. Thus, operator 328 interacts with operator interface mechanisms 324 to generate signals to control dig/dump actuators 378 to dump the material into the dump body of dump truck 202. Dump detector 338 detects this operation as well. Detecting the loading vehicle operator input to perform a dumping operation is indicated by block 552 in the flow diagram of FIG. 5. Executing the dumping operation in response to those inputs is indicated by block 554.

The load weighing mechanism 242 on dump truck 202 then detects the weight or mass of the material that it just received from loading vehicle 236. It communicates that information to load performance analysis system 357 on loading vehicle 236. Receiving the input from dump truck 202 indicating the received mass or weight of the material that was just dumped into it is indicated by block 556 in the flow diagram of FIG. 5.

Loading performance analysis system 357 then performs a dumping operation performance analysis based upon the received information. This is indicated by block 558. For instance, the dumped-to-received comparison system 360 can compare the weight or mass of the material that was weighed on loading vehicle 236 to the weight or mass of the material that was received on dump truck 202. This is indicated by block 560. Dumping efficiency determination system 364 can generate a metric indicative of the efficiency and/or accuracy of the dumping operation based upon the comparison. This is indicated by block 562. In addition, spillage detection system 362 can identify an amount of material that may have been spilled. If the value of the material dumped does not equal the value of the material received, then it is likely that the remainder spilled. Identifying spillage is indicated by block 564 in the flow diagram of FIG. 5. The dumping performance analysis can be done in a wide variety of other ways as well, and this is indicated by block 566.

Action signal generator 366 then generates an action signal based upon the dumping performance analysis. This is indicated by block 568. For instance, it can generate a control signal to control an alert mechanism on operator interface mechanisms 324 indicating spillage or inefficiency, or other information. This is indicated by block 570. It can generate an output indicating that the dump truck 202 should again be repositioned, because some material is being spilled. This is indicated by block 572. It can generate an output to operator 328 indicating that the operator should reduce the amount of material loaded into dump truck 202. This is indicated by block 574. The action signal can be generated in a wide variety of other ways to perform other actions as well, and this is indicated by block 576.

Figure 6:
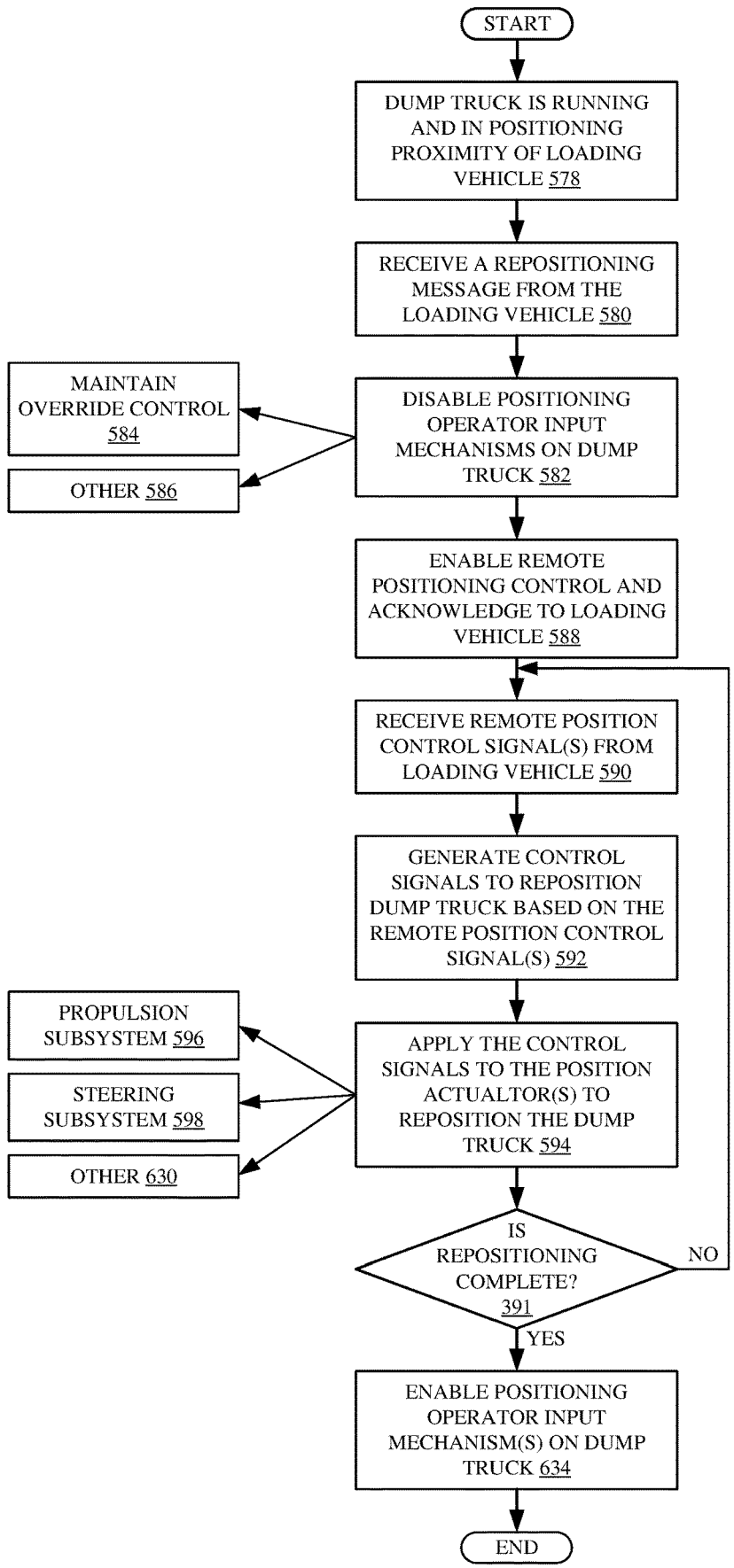
FIG. 6 is a flow diagram illustrating one example of the operation of a receiving vehicle (such as a dump truck) in allowing a loading vehicle operator to remotely control it for repositioning.

FIG. 6 is a flow diagram illustrating one example of the operation of dump truck in configuring itself to be remotely repositioned by the operator 328 of loading vehicle 236. It is first assumed that dump truck 202 is running and is in a position that is relatively closely proximate loading vehicle 236 so that loading vehicle 236 can reposition it. This is indicated by block 578 in the flow diagram of FIG. 6. Remote repositioning system 398 then receives the repositioning message generated by reposition message generator 348 on loading vehicle 236. This is indicated by block 580. The message indicates that operator 328 is about to begin remotely repositioning dump truck 202.

Position input mechanism enable/disable component 400 then disables the positioning operator interface mechanisms 388 on dump truck 202 so that operator 328 can control dump truck 202. Disabling the positioning operator input mechanisms 388 is indicated by block 582. In one example, the operator interface mechanisms 382 on dump truck 202 maintain an override actuator. In that case, it may be that operator 386 wishes to override the remote repositioning that is being performed or is about to be performed. This can be done by actuating the override actuator so that control of dump truck 202 reverts to operator 386. Maintaining override control is indicated by block 584. If operator 386 actuates the override actuator, then a corresponding message is provided to loading vehicle 236 and surfaced for operator 328. The positioning mechanisms 388 can be controlled in other ways as well, and this is indicated by block 586.

Once the positioning mechanisms 388 on dump truck 202 are disabled, then component 400 generates an acknowledgement back to receiving vehicle positioning system 344, indicating that dump truck 202 is ready to be remotely repositioned by operator 328 of loading vehicle 236. This is indicated by block 588.

Remote signal conversion logic 402 then receives the remote position control signals generated by position control generator 356 on loading vehicle 236. Those signals indicate how dump truck 202 is to be repositioned. Receiving the remote position control signals is indicated by block 590 in the flow diagram of FIG. 6. Remote signal conversion logic 402 then converts the received remote position control signals into signals that can be used by control signal generation logic 404 for generating control signals that are actually applied to the controllable subsystems 380 in order to control the position of dump truck 202. Generating the control signals to reposition the dump truck 202 based upon the remote position control signals is indicated by block 592 in the flow diagram of FIG. 6. Applying those control signals to the position actuators in controllable subsystems 380, to reposition dump truck 202, is indicated by block 594. In one example, the control signals control the propulsion subsystem 424 to move dump truck 202 either forward or in reverse. They can also control steering subsystems 426 to control the route or direction of travel of dump truck 202. Controlling the propulsion subsystem is indicated by block 596 and controlling the steering subsystem is indicated by block 598. The remote position control signals can control other actuators as well, and this is indicated by block 630 in the flow diagram of FIG. 6.

Once the repositioning operation is complete, as indicated by block 632, then positioning input mechanism enable/disable component 400 enables the positioning mechanisms 388 on the operator interface mechanisms 382 so that operator 386 is again in control of dump truck 202. This is indicated by block 634. The determination as to when repositioning is complete may be based on a signal generated from receiving vehicle positioning system 344 which is, itself, based upon an operator input indicating that the repositioning is complete. The determination as to whether repositioning is complete can be made in other ways as well.

Figure 7:
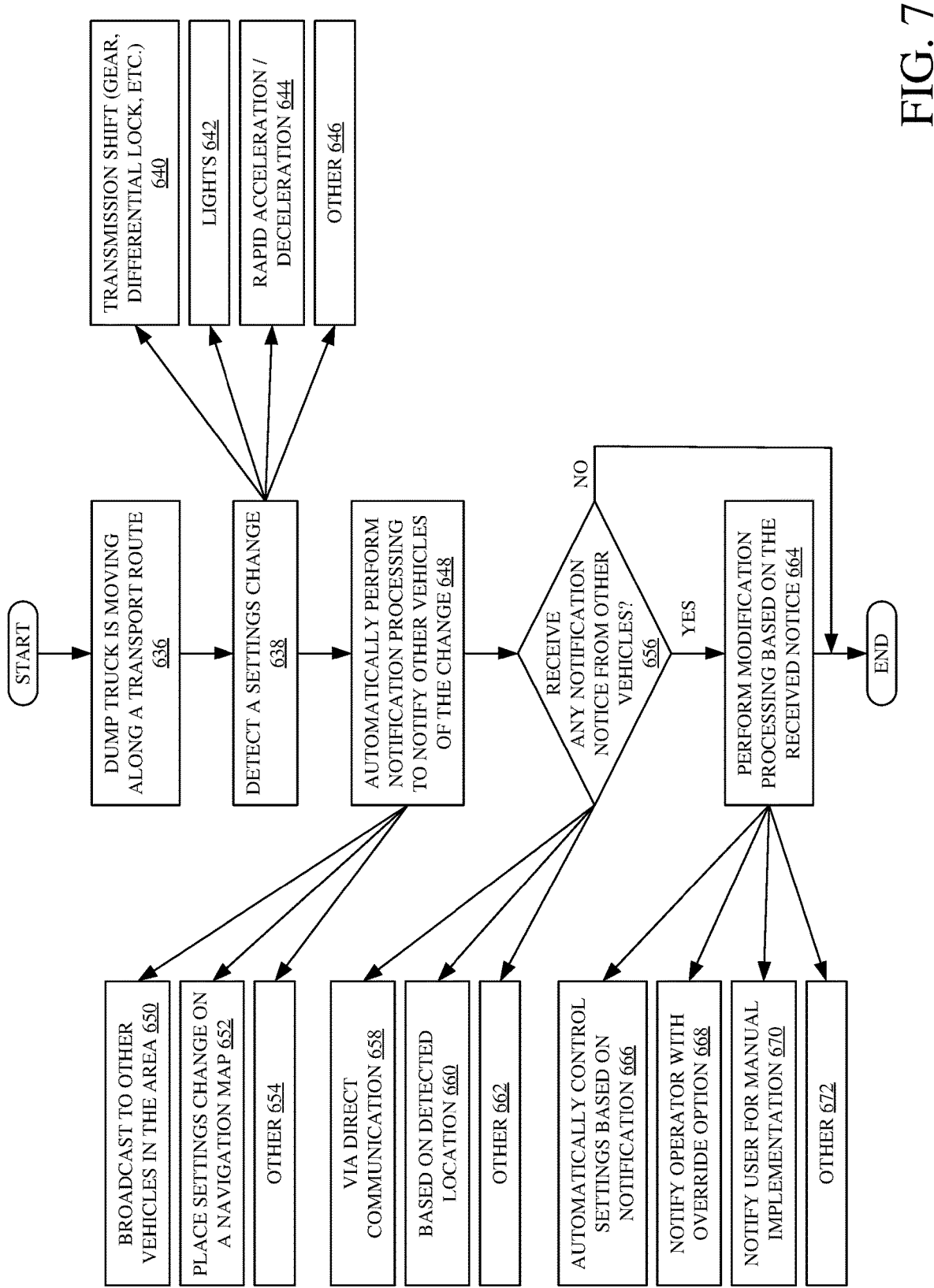
FIG. 7 is a flow diagram illustrating one example of the operation of a receiving vehicle (such as dump truck) in detecting a settings change and automatically communicating that settings change to other vehicles.

FIG. 7 is a flow diagram illustrating one example of the operation of dump truck 202 in automatically communicating notifications to other dump vehicles, such as other dump trucks. It is first assumed that dump truck 202 is moving along a transport route. This is indicated by block 636 in the flow diagram of FIG. 7. Settings change detector 410 then detects a settings change for which a notification is to be generated. This is indicated by block 638. In one example, the settings change is detected by detecting an operator input that makes a settings change, such as shifting gears, turning on headlights, engaging a differential lock, etc. In another example, the settings changes can be detected by detecting the gear shift in the transmission, by detecting the status of the headlights, by detecting the position of the accelerator, etc. Detecting a transmission shift (such as shifting gears, engaging differential lock, etc.), is indicated by block 640. Detecting that the lights are turned on or off is indicated by block 642. Detecting a rapid acceleration or deceleration is indicated by block 644. Of course, a wide variety of other settings changes can be detected as well, and this is indicated by block 646.

Automated notification system 414 then automatically performs notification processing to notify other vehicles of the detected settings change. This is indicated by block 648 in the flow diagram of FIG. 7. In one example, broadcast system 418 broadcasts the message on a frequency that can be received by the communication systems in other dump trucks or other vehicles. Also, it may be that broadcast system 418 specifically addresses certain vehicles so that only those vehicles will receive the message. Broadcasting to other vehicles in the area is indicated by block 650 in the flow diagram of FIG. 7.

In yet another example, map system 420 places a settings change indicator in a navigation map that is used by the other vehicles. By way of example, position detector 435 may detect a geographic position of dump truck 202 when the settings change occurred. It can place an indication of those coordinates and the settings change that occurred, on the map. Therefore, when other vehicles approach that location, they can access any settings change that may be applicable to them. This is indicated by block 652 in the flow diagram of FIG. 7. Automatically performing notification processing can be performed in a wide variety of other ways as well, and this is indicated by block 654.

Control change notification/detection system 408 also processes change detections that are broadcast or mapped by other vehicles and received by dump truck 202. Assume, for example, that dump truck 202 receives a notification from another vehicle (either by receiving a broadcast or by accessing a map system). This is indicated by block 656 in the flow diagram of FIG. 7. Receiving it by direct or broadcast communication is indicated by block 658. Receiving it based on a detected location in a map system is indicated by block 660. Receiving it in other ways as indicated by block 662.

Control change notification/detection system 408 then performs modification processing based upon the received notice. This is indicated by block 664. For example, control signal generator 412 can automatically control settings on dump truck 202 based upon the received notice. This is indicated by block 666. By way of example, assume that the notification indicates that another vehicle engaged differential lock at a specific geographic location. Then, as dump truck 202 approaches that geographic location, control signal generator 412 generates a control signal to control transmission subsystem 428 to engage differential lock at the appropriate location. Automatically controlling settings can control a wide variety of other controllable subsystems 380 as well.

In another example, control signal generator 412 generates a control signal to control operator interface mechanisms 382 to notify the operator that a settings change is about to be automatically made, and giving the operator the option to override that settings change. This is indicated by block 668. In another example, the settings change is surfaced for operator 386 on operator interface mechanisms 382. This gives operator 386 the opportunity to manually implement a settings change, if desired. This is indicated by block 670. The modification processing that is performed based upon the received notification can be performed in a wide variety of other ways as well. This is indicated by block 672.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For example, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 8:
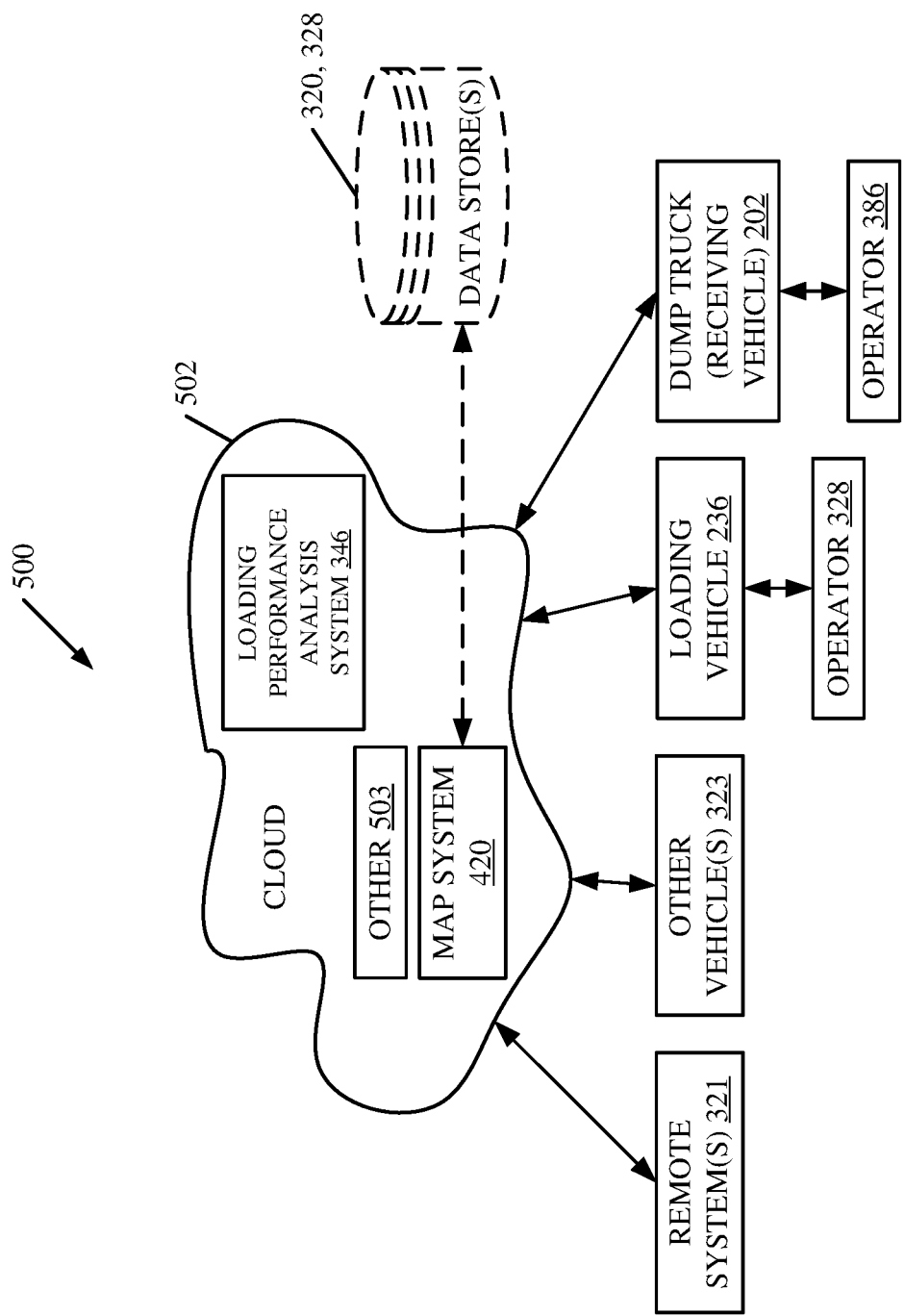
FIG. 8 is a block diagram showing one example of the material loading architecture illustrated in FIG. 4, deployed in a remote server architecture.

FIG. 8 is a block diagram of the machines, shown in FIG. 4, disposed in a remote server architecture 500. In an example remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 4 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the examples shown in FIG. 8, some items are similar to those shown in FIG. 4 and they are similarly numbered. FIG. 8 specifically shows that remote systems 321, load performance analysis system 357, map system 420 and/or other items 503 can be located at a remote server location 502. Therefore, vehicles 202, 236, and 323 can access those systems through remote server location 502.

FIG. 8 also depicts another example of a remote server architecture. FIG. 8 shows that it is also contemplated that some elements of FIG. 4 are disposed at remote server location 502 while others are not. By way of example, data stores 320, 328 can be disposed at a location separate from location 502, and accessed through the remote server at location 502. Regardless of where they are located, they can be accessed directly by vehicle 202, 236, 323, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. All of these architectures are contemplated herein.

It will also be noted that the elements of FIG. 4, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
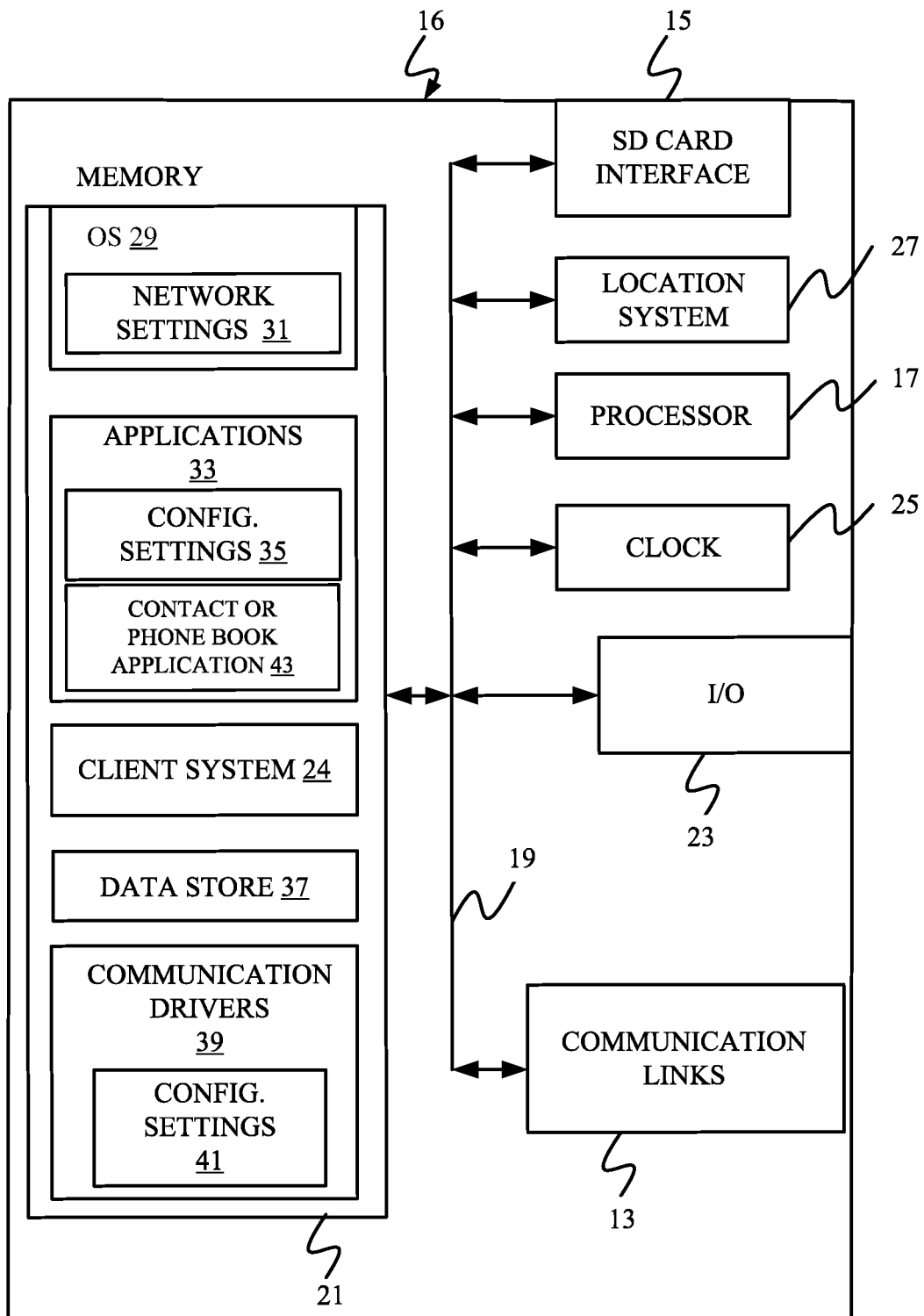
FIGS. 9-11 show examples of mobile devices that can be used in the architectures illustrated in other figures.
Figure 10:
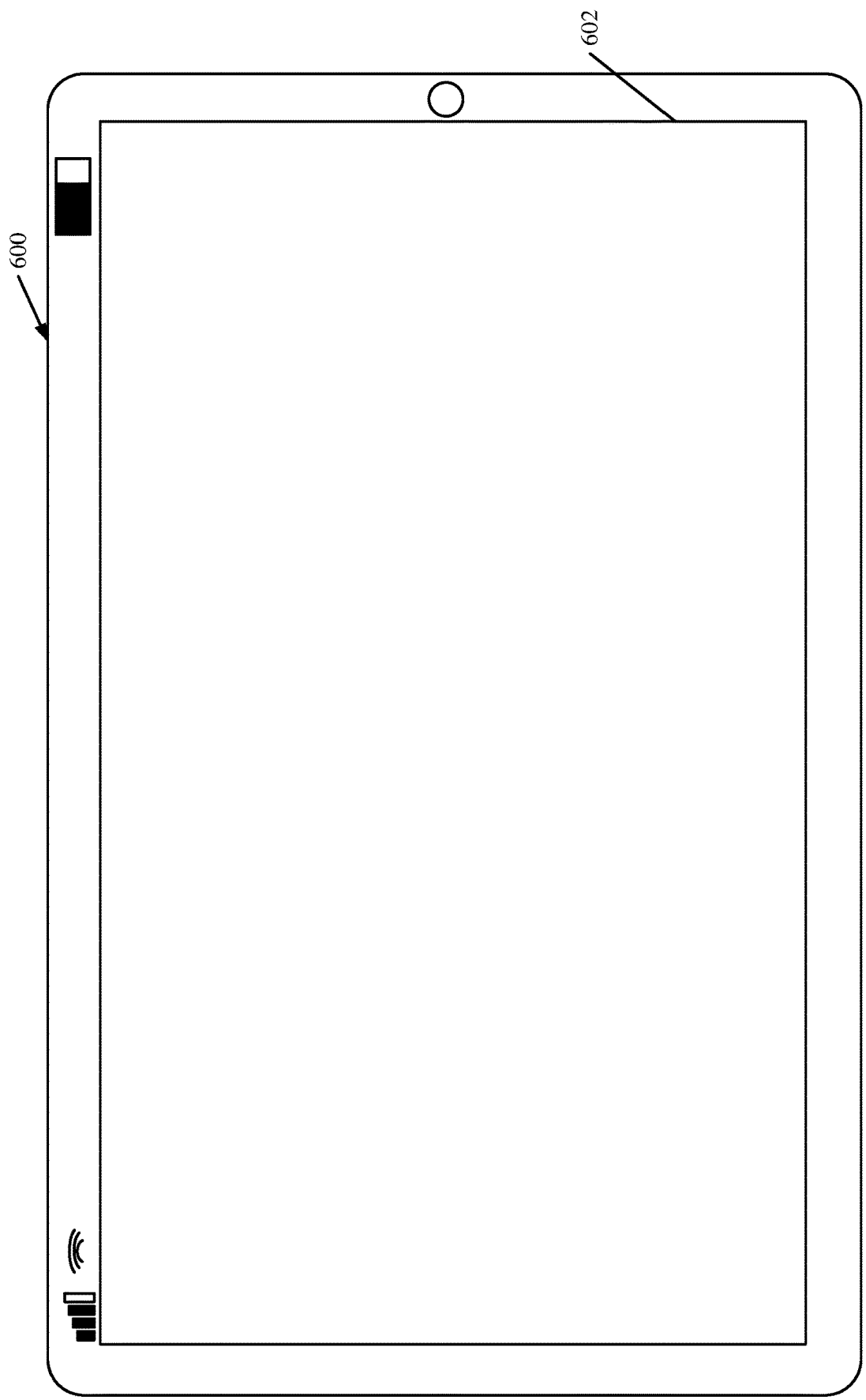
Figure 11:
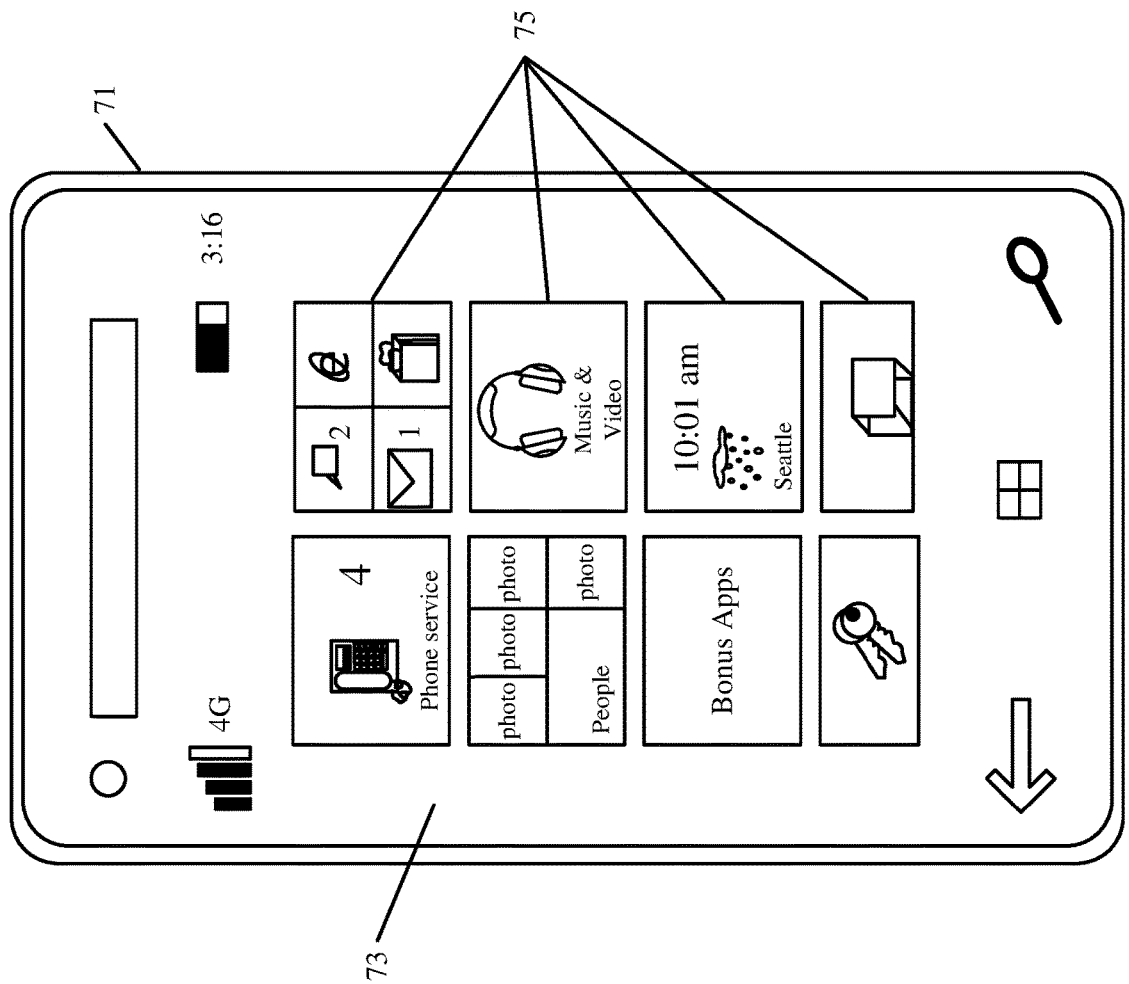

FIG. 9 is a simplified block diagram of one example of a handheld or mobile computing device that can be used as a user's or client's hand held device 16, in which the present system (or parts of it) can be deployed. For instance, a mobile device can be deployed in the operator compartment of vehicles 202, 236 and/or 323 for use in generating, processing, or displaying the data. FIGS. 10-11 are examples of handheld or mobile devices.

FIG. 9 provides a general block diagram of the components of a client device 16 that can run some components shown in FIG. 4, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 10 shows one example in which device 16 is a tablet computer 600. In FIG. 7, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 11 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
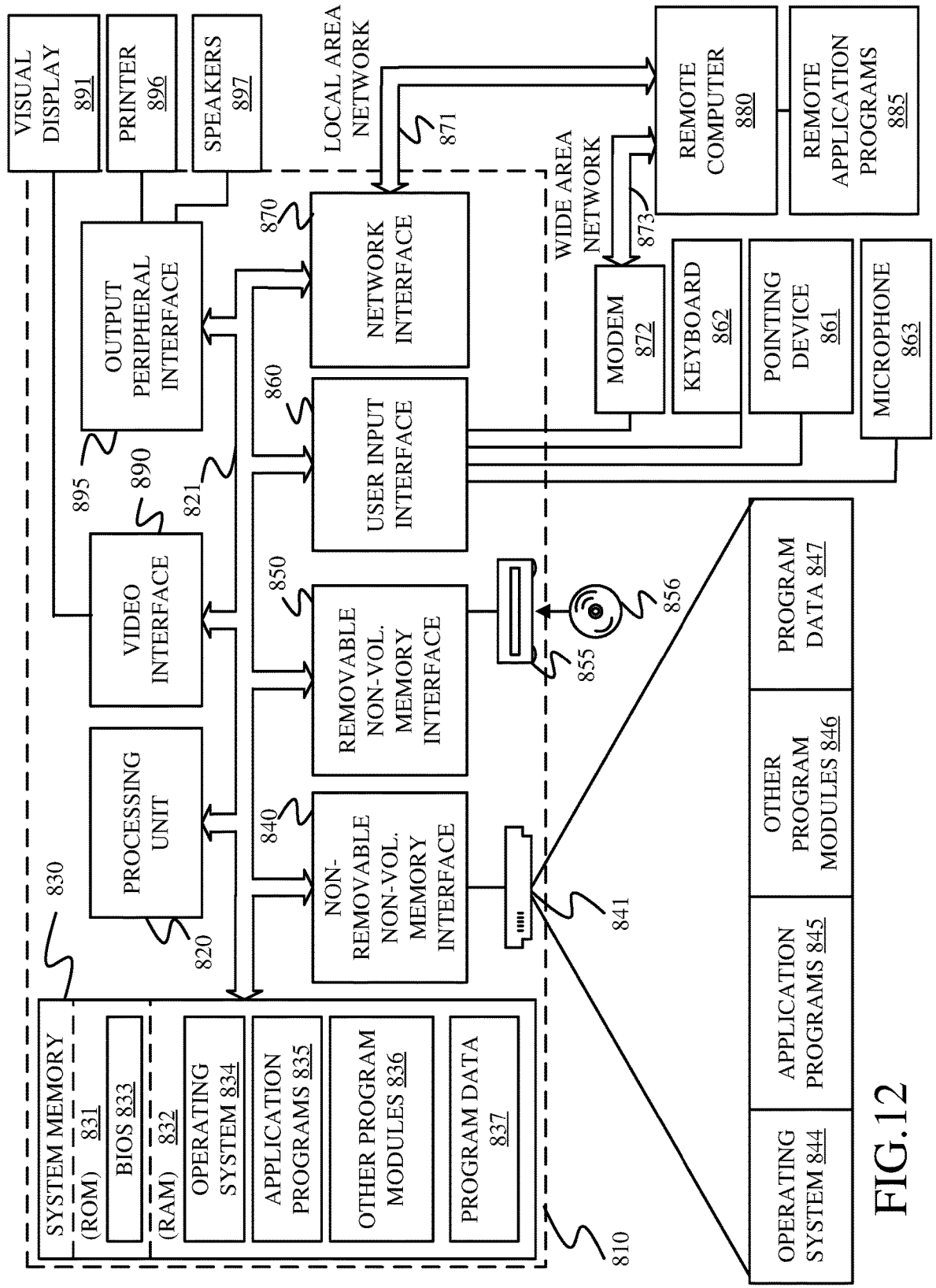
FIG. 12 is a block diagram showing one example of a computing environment that can be used in the architectures shown in previous figures.

FIG. 12 is one example of a computing environment in which elements of FIG. 4, or parts of it, (for example) can be deployed. With reference to FIG. 12, an exemplary system for implementing some embodiments includes a general-purpose computing device in the form of a computer 810. Components of computer 810 may include, but are not limited to, a processing unit 820 (which can comprise processors from other FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 4 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may include computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 12 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a control system for a loading vehicle, comprising:

a reposition message generator that generates a reposition message to a receiving vehicle indicating that an operator of the loading vehicle is to remotely reposition the receiving vehicle;

an interface configuration system that configures an operator interface mechanism on the loading vehicle to receive repositioning control inputs from a loading vehicle operator;

a position control signal generator that generates a position control signal, to reposition the receiving vehicle, based on the repositioning control inputs; and a communication system that communicates the position control signal from the loading vehicle to the receiving vehicle to perform a repositioning operation to remotely reposition the receiving vehicle.

Example 2 is the control system of any or all previous examples wherein the interface configuration system reconfigures the operator interface mechanism to receive loading vehicle control inputs, after the repositioning operation.

Example 3 is the control system of any or all previous examples and further comprising:

a position detector that detects a position of the receiving vehicle relative to the loading vehicle and generates a relative position signal; and a reposition identification system that automatically identifies whether a repositioning operation is to be performed based on the relative position signal.

Example 4 is the control system of any or all previous examples and further comprising:

a load weighing mechanism that is configured to detect a weight or mass of material carried by the loading vehicle prior to being loaded into a dump body on the receiving vehicle and to generate a first load value signal indicative of the detected weight or mass.

Example 5 is the control system of any or all previous examples and further comprising:

a comparison system that receives a second load value signal from the receiving vehicle, indicative of a weight or mass of material received by the receiving vehicle from the loading vehicle, and compares the first load value to the second load value to generate a comparison signal; and an action signal generator configured to generate an action signal based on the comparison signal.

Example 6 is the control system of any or all previous examples and further comprising:

a dig detector that detects a dig operation and generates a dig detected signal; and a dump detector that detects a dump operation when the material is loaded from the loading vehicle to the receiving vehicle and generates a dump detected signal, wherein the load weighing mechanism generates the first load value after the dig operation and before the dump operation based on the dig detected signal and the dump detected signal.

Example 7 is the control system of any or all previous examples and further comprising:

a spillage detection system configured to detect spillage of the material during loading based on the comparison signal, the action signal generator generating the action signal based on detected spillage.

Example 8 is a control system of a first dump vehicle, comprising:

a notification processing system that receives a settings change notification indicative of a settings change on a second dump vehicle and a first geographic location where the settings change on the second dump vehicle occurred;

a position detector that detects a geographic location of the first dump vehicle and generates a location signal indicative of the detected geographic location of the first dump vehicle; and a control signal generator that generates a settings control signal to control a controllable subsystem of the first dump vehicle based on the settings change indicated in the settings change notification, the first geographic location and the detected geographic location of the first dump vehicle.

Example 9 is the control system of any or all previous examples wherein the notification processing system comprises:

a map system accessible by the first dump vehicle, wherein the settings change notification is added as a marker at a geographic location on the map system and is indicative of the settings change.

Example 10 is the control system of any or all previous examples wherein the notification processing system comprises:

a communication system that receives a wireless communication of the settings change notification from the second dump vehicle.

Example 11 is the control system of any or all previous examples and further comprising:

a settings change detector that detects a settings change on the first dump vehicle and generates a settings change notification indicative of a geographic location where the settings change on the first dump vehicle occurred and the settings change on the first dump vehicle.

Example 12 is the control system of any or all previous examples wherein the notification processing system adds the settings change notification generated by the settings change detector to a map system that is accessible by the second dump vehicle.

Example 13 is the control system of any or all previous examples wherein the notification processing system comprises:

a broadcast system configured to communicate the settings change notification to other vehicles.

Example 14 is the control system of any or all previous examples wherein the first dump vehicle includes positioning operator input mechanisms that are actuated by an operator of the first dump vehicle to control the position of the first dump vehicle, and further comprising:

an input mechanism enable/disable component configured to receive a repositioning message from a loading vehicle, indicating that an operator of the loading vehicle is to remotely reposition the first dump vehicle, and disable the positioning operator input mechanisms.

Example 15 is the control system of any or all previous examples and further comprising:

remote signal conversion logic that receives a repositioning control signal from the loading vehicle and converts the repositioning control signal into a repositioning signal on the first dump vehicle.

Example 16 is the control system of any or all previous examples and further comprising:

control signal generator logic that generates a control signal to control a controllable subsystem on the first dump vehicle to reposition the first dump vehicle, based on the converted repositioning signal.

Example 17 is a control system for a loading vehicle, comprising:

a load weighing mechanism that is configured to detect a weight or mass of material carried by the loading vehicle prior to being loaded into a dump body on a receiving vehicle and to generate a first load value signal indicative of the detected weight or mass;

a comparison system that receives a second load value signal from the receiving vehicle, indicative of a weight or mass of material received by the receiving vehicle from the loading vehicle, and compares the first load value to the second load value to generate a comparison signal; and an action signal generator configured to generate an action signal based on the comparison signal.

Example 18 is the control system of any or all previous examples and further comprising:

a dig detector that detects a dig operation and generates a dig detected signal; and a dump detector that detects a dump operation when the material is loaded from the loading vehicle to the receiving vehicle and generates a dump detected signal, wherein the load weighing mechanism generates the first load value after the dig operation and before the dump operation based on the dig detected signal and the dump detected signal.

Example 19 is the control system of any or all previous examples and further comprising:

a spillage detection system configured to detect spillage of the material during loading based on the comparison signal, the action signal generator generating the action signal based on detected spillage.

Example 20 is the control system of any or all previous examples and further comprising:

an efficiency determination system that identifies a loading efficiency based on the comparison signal; and a communication system, wherein the action signal generator is configured to control the communication system to send the identified loading efficiency to a remote computing system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A control system for a loading vehicle, comprising:

a reposition message generator that generates a reposition message to a receiving vehicle indicating that an operator of the loading vehicle is to remotely reposition the receiving vehicle;

an interface configuration system that configures an operator interface mechanism on the loading vehicle to receive repositioning control inputs from a loading vehicle operator;

a position control signal generator that generates a position control signal, to reposition the receiving vehicle, based on the repositioning control inputs; and a communication system that communicates the position control signal from the loading vehicle to the receiving vehicle to perform a repositioning operation to remotely reposition the receiving vehicle.

2. The control system of claim 1 wherein the interface configuration system reconfigures the operator interface mechanism to receive loading vehicle control inputs, after the repositioning operation.

3. The control system of claim 2 and further comprising:

a position detector that detects a position of the receiving vehicle relative to the loading vehicle and generates a relative position signal; and a reposition identification system that automatically identifies whether a repositioning operation is to be performed based on the relative position signal.

4. The control system of claim 1 and further comprising:
a load weighing mechanism that is configured to detect a weight or mass of material carried by the loading vehicle prior to being loaded into a dump body on the receiving vehicle and to generate a first load value signal indicative of the detected weight or mass.

5. The control system of claim 4 and further comprising:
a comparison system that receives a second load value signal from the receiving vehicle, indicative of a weight or mass of material received by the receiving vehicle from the loading vehicle, and compares the first load value to the second load value to generate a comparison signal; and
an action signal generator configured to generate an action signal based on the comparison signal.

6. The control system of claim 5 and further comprising:
a dig detector that detects a dig operation and generates a dig detected signal; and
a dump detector that detects a dump operation when the material is loaded from the loading vehicle to the receiving vehicle and generates a dump detected signal, wherein the load weighing mechanism generates the first load value after the dig operation and before the dump operation based on the dig detected signal and the dump detected signal.

7. The control system of claim 5 and further comprising:
a spillage detection system configured to detect spillage of the material during loading based on the comparison signal, the action signal generator generating the action signal based on detected spillage.

8. A control system of a first dump vehicle, comprising:
a notification processing system that receives a settings change notification indicative of a settings change on a second dump vehicle and a first geographic location where the settings change on the second dump vehicle occurred;
a position detector that detects a geographic location of the first dump vehicle and generates a location signal indicative of the detected geographic location of the first dump vehicle; and
a control signal generator that generates a settings control signal to control a controllable subsystem of the first dump vehicle based on the settings change indicated in the settings change notification, the first geographic location and the detected geographic location of the first dump vehicle.

9. The control system of claim 8 wherein the notification processing system comprises:
a map system accessible by the first dump vehicle, wherein the settings change notification is added as a marker at a geographic location on the map system and is indicative of the settings change.

10. The control system of claim 9 and further comprising:
a settings change detector that detects a settings change on the first dump vehicle and generates a settings change notification indicative of a geographic location where the settings change on the first dump vehicle occurred and the settings change on the first dump vehicle.

11. The control system of claim 10 wherein the notification processing system adds the settings change notification generated by the settings change detector to a map system that is accessible by the second dump vehicle.

12. The control system of claim 10 wherein the notification processing system comprises:
a broadcast system configured to communicate the settings change notification to other vehicles.

13. The control system of claim 8 wherein the notification processing system comprises:
a communication system that receives a wireless communication of the settings change notification from the second dump vehicle.

14. The control system of claim 8 wherein the first dump vehicle includes positioning operator input mechanisms that are actuated by an operator of the first dump vehicle to control the position of the first dump vehicle, and further comprising:
an input mechanism enable/disable component configured to receive a repositioning message from a loading vehicle, indicating that an operator of the loading vehicle is to remotely reposition the first dump vehicle, and disable the positioning operator input mechanisms.

15. The control system of claim 14 and further comprising:
remote signal conversion logic that receives a repositioning control signal from the loading vehicle and converts the repositioning control signal into a repositioning signal on the first dump vehicle.

16. The control system of claim 15 and further comprising:
control signal generator logic that generates a control signal to control a controllable subsystem on the first dump vehicle to reposition the first dump vehicle, based on the converted repositioning signal.

* * * * *